(12) United States Patent
Takano

(10) Patent No.: US 7,477,695 B2
(45) Date of Patent: Jan. 13, 2009

(54) WIRELESS COMMUNICATION SYSTEM, WIRELESS COMMUNICATION APPARATUS, WIRELESS COMMUNICATION METHOD, AND COMPUTER PROGRAM

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 803 days.

(21) Appl. No.: 11/050,731

(22) Filed: Feb. 7, 2005

(65) Prior Publication Data

US 2005/0190850 A1    Sep. 1, 2005

(30) Foreign Application Priority Data

Feb. 18, 2004    (JP)    ............................ 2004-040934

(51) Int. Cl.
*H04L 23/02*    (2006.01)
*H03C 7/02*    (2006.01)

(52) U.S. Cl. ...................... 375/261; 455/101

(58) Field of Classification Search ................. 375/267, 375/269, 347, 299, 346, 261; 455/101, 132; 370/332, 334, 338
See application file for complete search history.

(56) References Cited

U.S. PATENT DOCUMENTS

2003/0185310 A1*  10/2003  Ketchum et al. ............ 375/259
2004/0192218 A1*   9/2004  Oprea ......................... 455/73
2006/0193294 A1*   8/2006  Jorswieck et al. ........... 370/334

* cited by examiner

*Primary Examiner*—Khai Tran
(74) *Attorney, Agent, or Firm*—Oblon, Spivak, McClelland, Maier & Neustadt, P.C.

(57) ABSTRACT

An SVD-MIMO transmission compresses the amount of information to be fed back to a transmitter from a receiver. The transmitter and the receiver share a representation form of (amplitude, phase) for representing data to be transmitted, i.e., a form of converting real data into complex data. In other words, transmitted data is allocated to a signal point in the signal space corresponding to the data value for data transmission. The data receiver extracts an original data value according to a combination of amplitude and phase at a received signal point. The receiver can compress the information amount of transmission data.

4 Claims, 5 Drawing Sheets

PRIOR ART

F I G. 7

PRIOR ART

F I G. 8

WIRELESS COMMUNICATION SYSTEM, WIRELESS COMMUNICATION APPARATUS, WIRELESS COMMUNICATION METHOD, AND COMPUTER PROGRAM

CROSS REFERENCES TO RELATED APPLICATIONS

"The present invention contains subject matter related to Japanese Patent Application JP2004-040934 filed in the Japanese Patent Office on Feb. 18, 2004, the entire contents of which being incorporated herein by reference."

BACKGROUND OF THE INVENTION

1. Field of the Invention

The present invention relates to a wireless communication system, a wireless communication apparatus, a wireless communication method, and a computer program for mutual communication between plural wireless stations such as wireless LANs (Local Area Networks). More specifically, the present invention relates to a wireless communication system, a wireless communication apparatus, a wireless communication method, and a computer program for implementing broadband wireless transmission under communication environment such as in the home.

In more detail, the present invention relates to a wireless communication system, a wireless communication apparatus, a wireless communication method, and a computer program for enhancing the transmission capacity by means of communication (MIMO communication) based on space division multiplexing using a pair of a transmitter having plural antennas and a receiver having plural antennas. More particularly, the present invention relates to a wireless communication system, a wireless communication apparatus, a wireless communication method, and a computer program for performing MIMO transmission using singular value decomposition (SVD) of a channel information matrix composed of channels corresponding to antenna pairs for transmission and reception.

2. Description of Related Art

Computer networking such as LAN can be used to efficiently share information resources and hardware resources. Particular attention is paid to wireless LAN as a system to free users from LAN wiring based on conventional wired systems. The wireless LAN can eliminate most of cables in work places such as offices, making it possible to relatively easily move communication terminals such as personal computers (PCs).

In recent years, there is a remarkably increasing demand for wireless LAN systems as they achieve higher speed and become available at reduced costs. Particularly, introduction of a personal area network (PAN) is especially being considered to construct a small-scale network for information communication between electronic devices available around users. For example, there are provided different wireless communication systems and wireless communication apparatuses using frequency bands such as 2.4 GHz and 5 GHz bands that need not be licensed by governing legal authorities.

Typical wireless network standards include IEEE (The Institute of Electrical and Electronics Engineers) 802.11 (e.g., see non-patent document 1), HiperLAN/2 (e.g., see non-patent document 2 or 3), IEEE302.15.3, and Bluetooth communication. The IEEE802.11 standard further includes extension standards such as IEEE802.11a (e.g., see non-patent document 4), IEEE802.11b,. and IEEE802.11g depending on differences in the wireless communication systems and frequency bands to be used.

The IEEE802.11a standard supports modulation systems that reach up to 54 Mbps of communication speed. A need exists for wireless standards capable of higher bit rates in terms of communication speeds. In recent years, particular attention is placed on the MIMO (Multi-Input Multi-Output) communication technology. According to this technology, plural antenna elements are provided for both a transmitter and a receiver. The technology implements space division multiplexing, i.e., plural logically independent transmission paths (hereafter also referred to as "MIMO channels") to enhance the transmission capacity and improve the communication speed. The MIMO communication uses the space division multiplexing to provide efficient use of frequencies.

Figure 7:
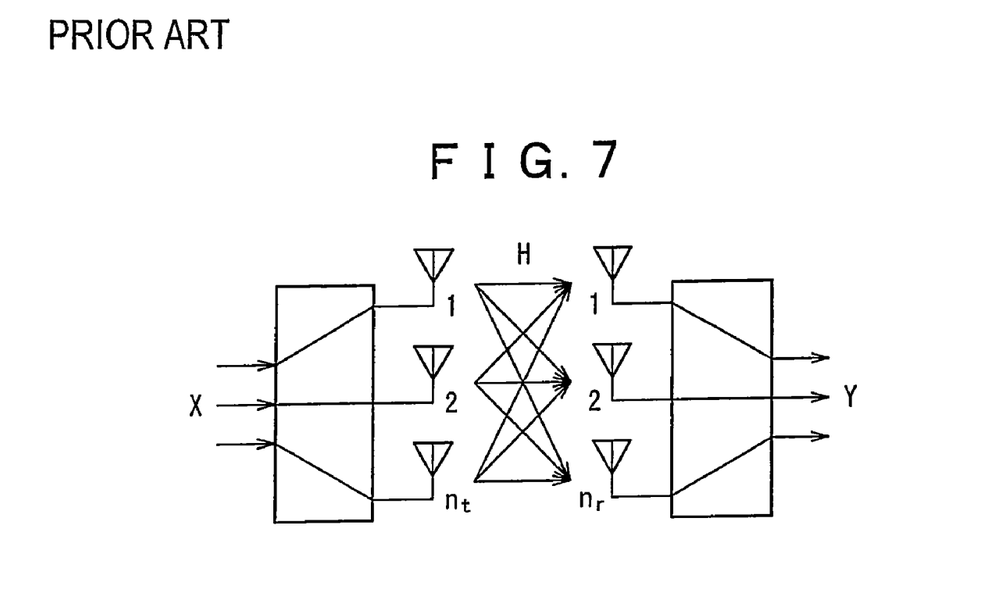
FIG. 7 schematically shows a MIMO communication system (prior art)

FIG. 7 schematically shows a MIMO communication system. As shown in FIG. 7, a transmitter and a receiver each have plural antennas. The transmitter space/time-encodes plural transmission data, multiplexes and distributes it to M antennas for transmission to plural MIMO channels. The receiver receives a signal at N antennas via channels and space/time-decodes the received signal to obtain reception data. The MIMO communication differs from a simple transmission/reception adaptive array. In this case, a channel model comprises a transmitter-related radio wave environment (transfer function), a channel space structure (transfer function), and a receiver-related radio wave environment (transfer function). A crosstalk occurs during multiplexing of a signal transmitted from each antenna. The receiver can perform a signal process to correctly retrieve multiplexed signals without crosstalk.

In short, the MIMO communication system uses the transmitter to send transmission data by distributing it to plural antennas. The transmitter uses plural virtual MIMO channels for transmission. The receiver receives a signal via plural antennas and performs a signal process to obtain reception data. In this manner, the communication system uses channel characteristics. There are various systems as MIMO transmission construction methods. One of ideal modes is known as the SVD-MIMO system (e.g., see non-patent document 5) using singular value decomposition (SVD) of transfer functions.

Figure 8:
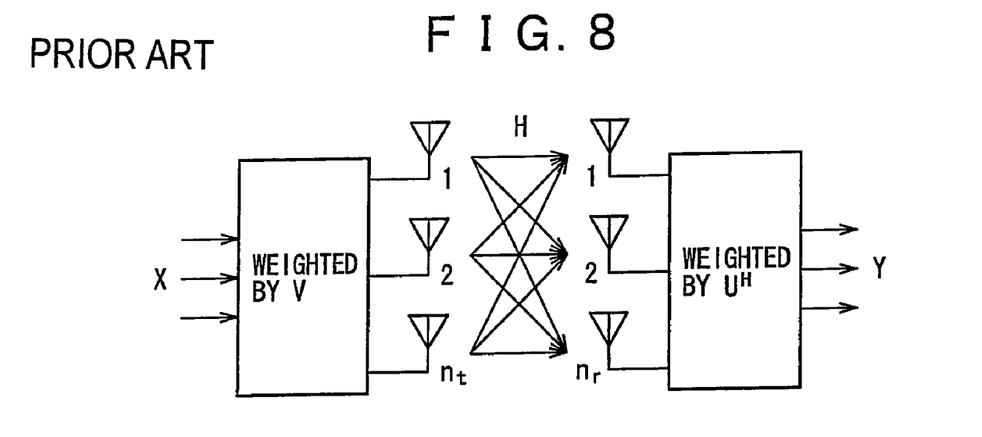
FIG. 8 schematically shows an SVD-MIMO transmission system (prior art).

FIG. 8 schematically shows an SVD-MIMO system. The SVD-MIMO transmission system finds $UDV^H$ by performing a singular value decomposition for a numeric matrix composed of channel information corresponding to each antenna pair, i.e., channel information matrix H. The system gives V as an antenna weight coefficient matrix for the transmitter and $U^H$ as an antenna weight coefficient matrix for the transmitter. Consequently, each MIMO channel is represented as diagonal matrix D whose diagonal element is a square root of unique value $\lambda i$. Signals can be multiplexed for transmission with no crosstalk.

The following needs to be considered. It is not easy to realtime perform singular value decompositions. A need exists for a setup procedure to previously notify a destination of derived V or $U^H$.

The SVD-MIMO transmission system can provide the theoretically maximum communication capacity. When the transmitter and the receiver each have two antennas, for example, the transmission capacity can be doubled maximumly.

The following describes a mechanism of the SVD-MIMO transmission system in detail. When the number of transmitter antennas is assumed to be M, transmitted signal x is represented as vector M×1. When the number of receiver antennas is assumed to be N, received signal y is represented as vector N×1. In this case, the channel characteristic is represented as numeric matrix H of N×M. Element $h_{ij}$ of channel information matrix H is a transfer function from the jth transmission antenna to the ith reception antenna. As expressed in equation (1) below, the received signal vector y is represented by multiplying the transmitted signal vector by the channel information matrix and by adding noise vector n.

$$y=Hx+n \quad (1)$$

As mentioned above, a singular value decomposition is performed for the channel information matrix H to result in equation (2) below.

$$H=UDV^H \quad (2)$$

where transmitter's antenna weight coefficient matrix V and receiver's antenna weight matrix U are unitary matrices satisfying equations (3) and (4) below, respectively.

$$U^H U=I \quad (3)$$

$$V^H V=I \quad (4)$$

That is, arranging unique vectors with normalized $HH^H$ constitutes receiver's antenna weight matrix $U^H$. Arranging unique vectors with normalized $H^H H$ constitutes transmitter's antenna weight matrix V. D is a diagonal matrix and contains a diagonal element equivalent to a square root of unique value $H^H H$ or $HH^H$. The size is the number of transmission antennas M or the number of reception antennas N whichever is smaller. The size is a square matrix of size min[M,N] and corresponds to a diagonal matrix.

$$D = \begin{bmatrix} \sqrt{\lambda_1} & \cdots & & 0 \\ \vdots & \sqrt{\lambda_2} & & \\ & & \ddots & \\ 0 & & & \sqrt{\lambda_{\min(M,N)}} \end{bmatrix} \quad (5)$$

While there has been described the singular value decomposition for real numbers, some considerations are needed when the singular value decomposition is extended to imaginary numbers. It is assumed that U and V are matrices composed of unique vectors. Even though unique vectors are normalized to set the norm to 1, U and V do not become unitary, allowing the existence of many unique vectors with different phases. The above-mentioned equation (2) may be invalid depending on phase relationship between U and V. Even though U and V are correct, only the phases rotate independently. To enable phases to completely correspond to each other, V is normally found as a unique vector for $H^H H$. As shown in the following equation, U is found by multiplying V and both terms of the above-mentioned equation (2) together from the right.

$$HV=UDV^H V=UDI=UD$$

$$U=HVD^{-1} \quad (6)$$

The transmitter provides weight using the antenna weight coefficient matrix V. The receiver provides weight using the antenna weight coefficient matrix $U^H$ for reception. Since U and V are unitary matrices (U is N×min[M,N] and V is M×min[M,N]), the following equation takes effect.

$$y = U^H HVx + U^H n \quad (7)$$
$$= U^H(UDV^H)Vx + U^H n$$
$$= (U^H U)D(V^H V)x + U^H n$$
$$= IDIx + U^H n$$
$$y = Dx + U^H n$$

The received signal y and the transmitted signal x are (min[M,N]×1) vectors, not vectors determined by the number of transmission antennas and reception antennas.

Since D is a diagonal matrix, transmitted signals can be received without crosstalk. Since the amplitude of each independent MIMO channel is proportional to a square root of the unique value λ, the electric power magnitude for each MIMO channel is proportional to λ.

Since noise element n is also a unique vector having the U column whose norm is normalized to 1, $U^H n$ does not change the noise power. The size is the same as y and x because $U^H n$ is a (min[M,N]) vector.

Despite the same frequency and the same time, the SVD-MIMO transmission can provide plural logically independent MIMO channels without crosstalk. That is, this makes it possible to transmit plural pieces of data through wireless communication at the same time using the same frequency, improving the transmission speed.

Generally, the number of MIMO channels available for the SVD-MIMO communication system is equivalent to the number of transmission antennas M or the number of reception antennas N whichever is smaller, i.e., min[M,N]. The transmitter's antenna weight coefficient matrix V comprises transmission vectors vi for the number of MIMO channels ($V=[v_1, v_2, \ldots, v_{min[M,N]}]$). The number of elements for each transmission vector $v_i$ corresponds to the number of transmission antennas M.

[Non-patent document 1] International Standard ISO/IEC 8802-11:1999(E) ANSI/IEEE Std 802.11, 1999 Edition, Part 11: Wireless LAN Medium Access Control (MAC) and Physical Layer (PHY) Specifications

[Non-patent document 2] ETSI Standard ETSI TS 101 761-1 V1.3.1 Broadband Radio Access Networks (BRAN); HIPERLAN Type 2; Data Link Control (DLC) Layer; Part 1: Basic Data Transport Functions

[Non-patent document 3] ETSI TS 101 761-2 V1.3.1 Broadband Radio Access Networks(BRAN); HIPERLAN Type 2; Data Link Control (DLC) Layer; Part 2: Radio Link Control (RLC) sublayer

[Non-patent document 4] Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-speed Physical Layer in the 5 GHZ Band

[Non-patent document 5]

http://radio3.ee.uec.ac.jp/MIMO(IEICE_TS).pdf (as of Oct. 24, 2003)

According to the SVD-MIMO system, the receiver needs to obtain channel information matrix H, perform a singular value decomposition for H, and transfer $V_H$ out of the decomposed $UDV^H$ to the transmitter. Since the transmitter actually uses only V, the receiver needs to transfer V to the transmitter.

The following describes the information amount of the transmitter's antenna coefficient matrix V using an example of the 5 GHz pair OFDM (Orthogonal Frequency Division Multiplexing) communication system. It complies with IEEE802.11a, one of LAN systems to which the SVD-MIMO transmission is applied.

When it is assumed that there are three antenna elements for each of the transmitter and the receiver, there are 3×3 matrices for the transmitter's antenna coefficient matrices V. Therefore, nine elements are available. It is assumed that one element is represented by a real number and a complex number with the 10-bit accuracy and is needed for 52 carriers. Then, the receiver must feed 9360 bits back to the transmitter, i.e., 9360 bits=9 (the number of matrices)×2 (real part and imaginary part of the complex number)×10 bits×52 (the number of OFDM subcarriers).

The MIMO requiring the feedback is called a closed loop MIMO (contrary to an open loop MIMO). Before initiating communication, a closed loop SVD-MIMO system must feed information as much as 9360 bits back to the transmitter. Let us assume that an attempt is made for feedback using the BPSK (Binary Phase Shift Keying) and the OFDM according to the modulation at a half code rate. The BPSK is the most reliable modulation provided by IEEE802.11a. In this case, one OFDM can transmit only 24 bits. The time required is equivalent to 3900 OFDM symbols. This is not realistic.

The communication can start when the receiver first transfers the antenna weight coefficient matrix V to the transmitter. However, a chronological change also changes elements (i.e., transfer functions) of the channel matrix H. Chronological changes in the channel matrix H chiefly result from indoor changes of reflection paths and temperature due to the movement of human beings and objects.

When the channel characteristics chronologically change in this manner, the receiver needs to obtain the channel matrix H again and performs a singular value decomposition for the new H. The receiver feeds a new transmitter's weight coefficient matrix V back to the transmitter and requests transmission weighed by the new V (i.e., restudy of V). Further, the receiver itself needs to decode received signals using new $U^H$.

During the SVD-MIMO transmission, the inventors consider it necessary to compress the amount of information to be fed back to the transmitter from the receiver.

SUMMARY OF THE INVENTION

The present invention has been made in consideration of the foregoing. It is therefore an object of the present invention to provide an excellent wireless communication system, wireless communication apparatus, wireless communication method, and computer program capable of implementing broadband wireless transmission under communication environment such as in the home.

It is another object of the present invention is to provide an excellent wireless communication system, wireless communication apparatus, wireless communication method, and computer program capable of enhancing the transmission capacity by means of communication (MIMO communication) based on space division multiplexing using a pair of a transmitter having plural antennas and a receiver having plural antennas.

It is still another object of the present invention is to provide an excellent wireless communication system, wireless communication apparatus, wireless communication method, and computer program capable of performing MIMO transmission using singular value decomposition (SVD) of a channel information matrix composed of channels corresponding to antenna pairs for transmission and reception.

It is yet another object of the present invention is to provide an excellent wireless communication system, wireless communication apparatus, wireless communication method, and computer program capable of compressing the amount of information to be fed back to the transmitter from the receiver during SVD-MIMO transmission.

The present invention has been made in consideration of the foregoing. According to a first aspect of the invention, there is provided a wireless communication system, wherein a transmitter and a receiver share a representation form of (amplitude, phase) for representing data to be transmitted;

wherein a data transmission side transmit data by allocating it to a signal point in a signal space corresponding to a data value; and wherein a data reception side extracts an original data value according to a combination of amplitude and phase at a receive signal point.

The "system" here signifies a logical aggregate of plural apparatuses (or function modules implementing specific functions) irrespectively of whether or not the apparatuses or modules are included in a single container.

When the SVD-MIMO transmission is performed on a down-link from the transmitter to the receiver, the receiver needs to feed information about transmission weight coefficient matrix V back to the transmitter. The present invention uses means for transmitting data for V from the receiver to the transmitter. Specifically, the means modulates the amplitude and the phase of a data value to be transmitted and uses a BPSK (Binary Phase Shift Keying) signal.

A normal BPSK modulation system allocates a carrier phase to 0 and another phase (shifted by 180 degrees) reverse to the carrier to 1. deviated phase. Data is disposed at two points (1, 0) and (-1, 0) in the signal space. The receiver detects a phase shift from the carrier to identify whether the transmitted signal is 0 or 1.

According to the present invention, the transmitter and the receiver share a representation form of (amplitude, phase) for representing data to be transmitted, i.e., a form of converting real data into complex data. In other words, transmitted data is allocated to a signal point in the signal space corresponding to the data value for data transmission. The data receiver extracts an original data value according to a combination of amplitude and phase at a received signal point. The receiver can compress the information amount of transmission data.

Specifically, data to be transmitted signifies transmission vectors v constituting the transmission weight coefficient matrix V. That is, the receiver in the SVD-MIMO transmission transmits data by supplying it with an amplitude and a phase corresponding to a vector v resulting from the singular value decomposition.

Figure 1:
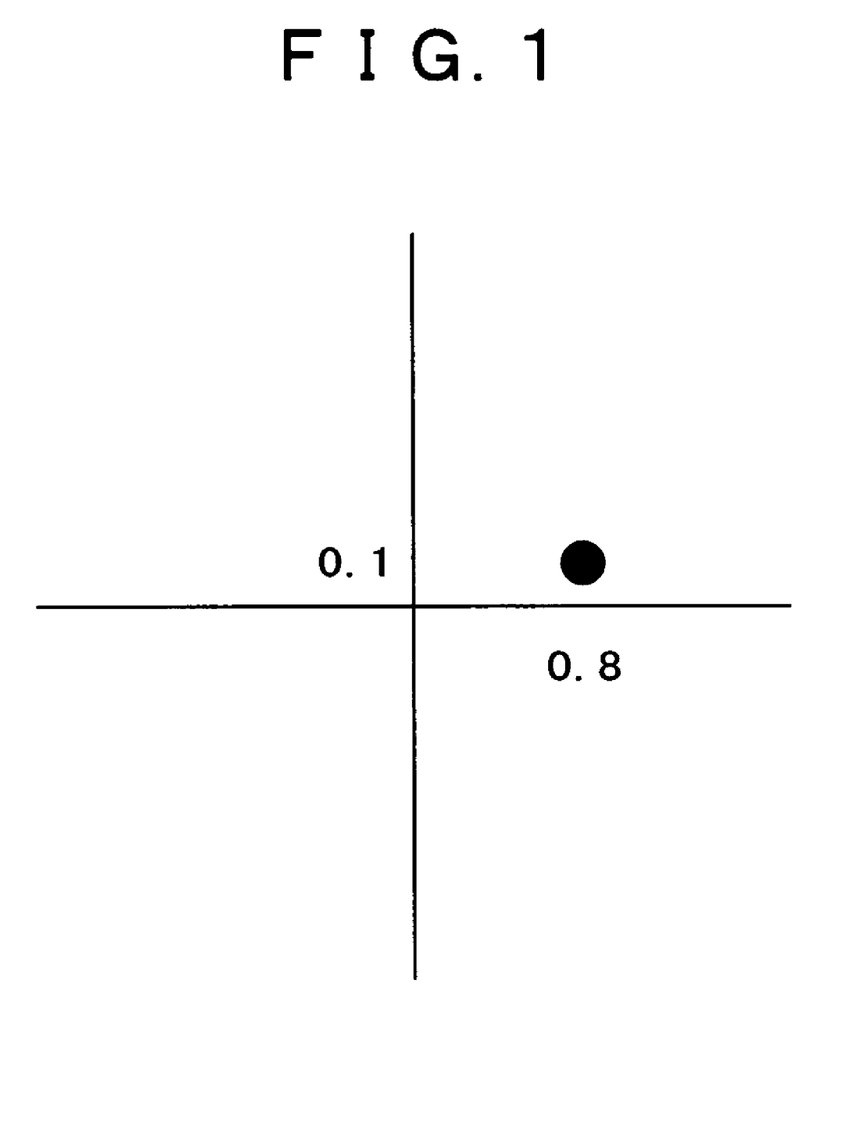
FIG. 1 shows how transmission data is mapped onto a signal space.
Figure 2:
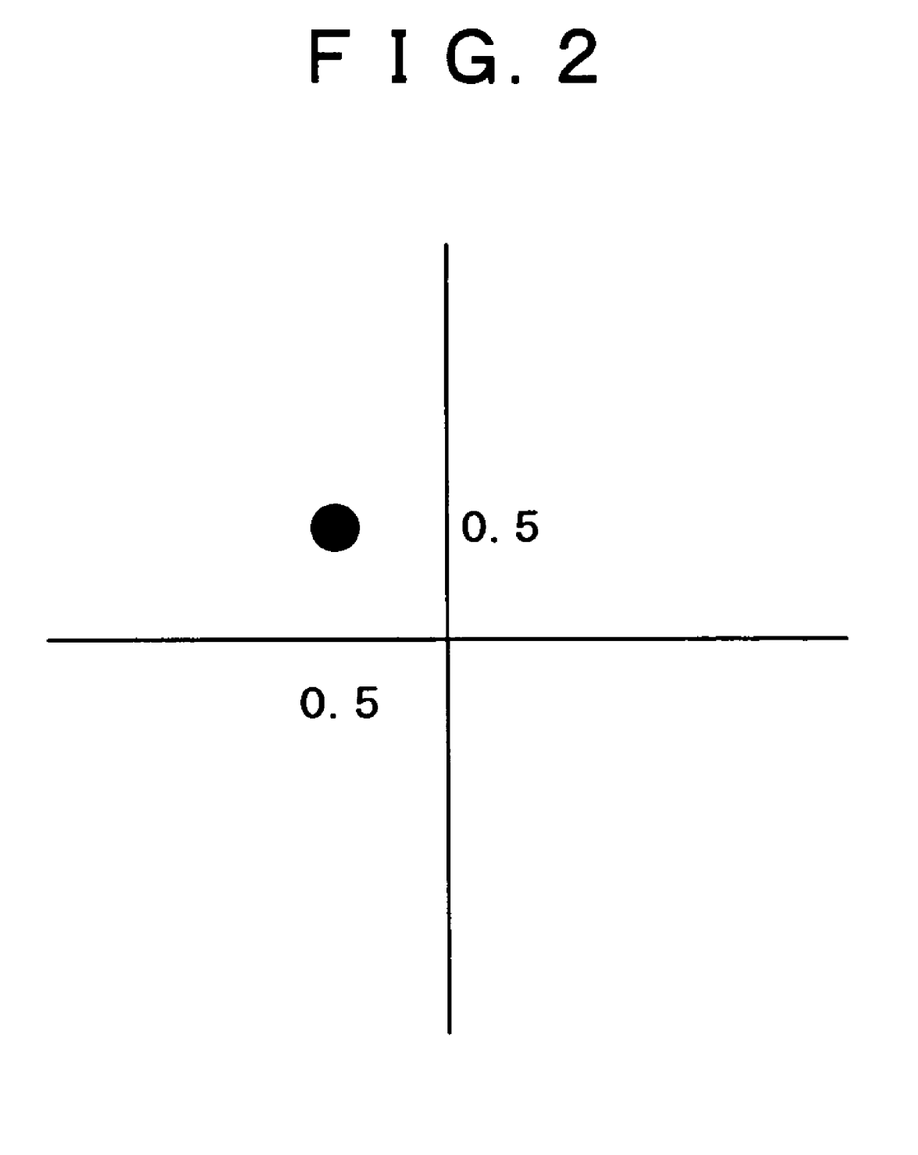
FIG. 2 shows how transmission data is mapped onto a signal space.

For example, let us assume $V=[0.8+0.1j, -0.5+0.5j]^T$. This example assumes that two transmission antennas are used and the vector v contains two elements. The number of vectors v corresponds to the number of subcarriers. The vector v is assumed to be used for one subcarrier. Elements of the vector v are transmitted by changing amplitudes and phases. For example, the value 0.8+0.1j is transmitted by disposing a signal as shown in FIG. 1. The value -0.5+0.5j is transmitted by disposing a signal as shown in FIG. 2. In this case, the transmission uses two OFDM symbols of amplitude and phase modulation signal for the vector v. The reference signal is transmitted prior to the transmission signal for the vector v. Using the reference signal, the transmitter receives the amplitude and phase modulation signal for the vector v. The transmitter removes fluctuations on the transmission path from the received amplitude and phase modulation signal to restore the intended vector v.

For example, the IEEE802.11a standard uses an OFDM modulation system for the physical layer. The OFDM modulation system allows the vector v to be acquired for each subcarrier. Each OFDM subcarrier necessitates transmission of as many vectors v as the number of transmission antennas multiplied by the number of MIMO channels.

For example, let us assume that an SVD-MIMO communication system comprises 2×3 transmission/reception antennas, i.e., two antennas for a transmitter and three antennas for a receiver. In such case, the system provides two 2×1 vectors v for one subcarrier. The value 2 is equivalent to the number of independent streams to be transmitted or the number of independent MIMO channels, i.e., smaller than or equal to the number of transmission antennas or reception antennas whichever is smaller. The system generates two 2×1 vectors for one subcarrier. The IEEE802.11a standard generates the vectors for 52 carriers.

When the system transmits one OFDM symbol of amplitude and phase modulation signal for vectors, the system can transmit one vector v for 52 carriers at a time. Therefore, the 2×3 SVD-MIMO communication system just needs to transmit the reference signal, and then two OFDM symbols of the amplitude and phase modulation signal for the vectors v.

According to a second aspect of the invention, there is provided a computer-readable computer program which allows a computer system to perform process for using plural antennas to receive a multiplexed signal from a transmitter having plural antennas, the computer program comprising;

finding channel matrix H from a reference signal transmitted from a transmitter;

performing a singular value decomposition for channel matrix H into $UDV^H$ to acquire reception weight matrix U, diagonal matrix D, and transmission weight matrix V;

allocating element vectors constituting transmission antenna weight matrix V to a signal point in a signal space for encoding; and feeding the encoded signal back to the transmitter.

The computer program according to the second aspect of the invention defines a computer-readable computer program so as to implement specified processes on a computer system. In other words, installing the computer program according to the second aspect of the invention on the computer system exhibits cooperative effects on the computer system. The system operates as a wireless communication apparatus. Plural such wireless communication apparatuses are activated to construct a wireless network. This makes it possible to provide the same effect as the wireless communication system according to the firs aspect of the present invention.

The present invention can provide an excellent wireless communication system, wireless communication apparatus, wireless communication method, and computer program capable of performing MIMO transmission using singular value decomposition (SVD) of a channel information matrix composed of channels corresponding to antenna pairs for transmission and reception.

The present invention can provide an excellent wireless communication system, wireless communication apparatus, wireless communication method, and computer program capable of compressing the amount of information to be fed back to the transmitter from the receiver during SVD-MIMO transmission.

Incidentally, in addition to the above-mentioned related art, there have been proposed by the present inventors techniques related to the present invention as disclosed in unpublished Japanese Patent Application Nos. 2003-426294, 2004-140485, 2004-269754, 2004-140488, and 2004-140486.

These and other objects, features, and advantages of the present invention may be readily ascertained by referring to the following detailed description of an embodiment of the present invention and appended drawings.

DETAILED DESCRIPTION OF THE PREFERRED EMBODIMENTS

An embodiment the present invention will be described in further detail with reference to the accompanying drawings.

Figure 3:
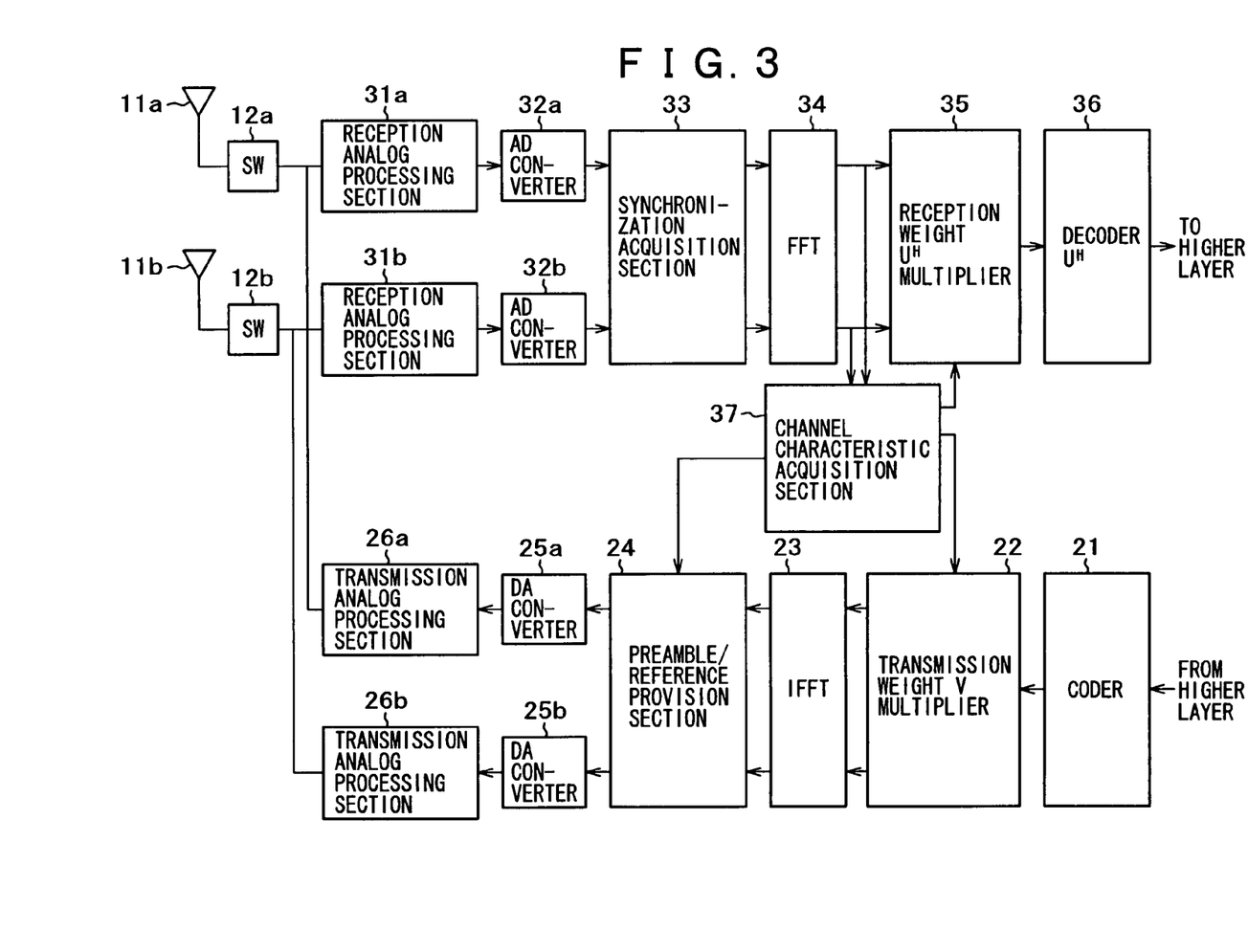
FIG. 3 schematically shows the configuration of a wireless communication apparatus 1 according to an embodiment of the present invention.

FIG. 3 schematically shows the configuration of a wireless communication apparatus 1 according to an embodiment of the present invention. In FIG. 3, the wireless communication apparatus 1 has two transmission/reception antennas 11a and 11b and is capable of SVD-MIMO data transmission. During transmission, the apparatus supplies a transmission antenna weight coefficient to each transmitted signal to be multiplexed, space/time-encodes signals, and distributes them to the two antennas 11a and 11b for transmission to channels. The receiver receives multiplexed signals at the two antennas 11a and 11b via channels, supplies a reception antenna weight coefficient to the signals, and space/time-decodes them to obtain received data. However, the present invention is not limited to two antennas and may use three or more antennas.

The transmission/reception antennas 11a and 11b parallel connect with a transmission system and a reception system via switches 12a and 12b to wirelessly transmit signals to the other wireless communication apparatuses using specified frequency channels. Alternatively, the apparatus collects signals transmitted from the other wireless communication apparatuses. The switches 12a and 12b connect the transmission/reception antennas 11a and 11b exclusively to one of the transmission and reception systems to disable concurrent transmission and reception.

Each transmission system has a coder 21, a transmission weight multiplier 22, an IFFT 23, a preamble/reference provision section 24, a D/A converter 25, and a transmission analog processing section 26.

The coder 21 uses an error correction code to encode transmission data transmitted from a higher layer of the communication protocol. At this time, it may be preferable to insert a known data series as a pilot symbol into the modulation symbol series according to a pilot symbol insertion pattern and the timing. The coder inserts a pilot signal comprising a known pattern at an interval of each subcarrier or the specified number of subcarriers.

The transmission weight multiplier 22 maintains transmission weight matrix V. The transmission weight multiplier 22 obtains this matrix by receiving reference symbols from a transmission destination correspondingly to the number of antennas, estimating channels to obtain channel matrix H, and performing a singular value decomposition for the channel matrix H. The transmission weight multiplier 22 multiplies a transmitted signal after encoding by the weight matrix V. The transmission weight matrix V is constructed based on information transmitted from a wireless communication apparatus (not shown) as a communication destination and is placed in the transmission weight multiplier 22.

The IFFT (inverse Fourier transform section) 23 converts a modulated serial signal into parallel data equivalent to the number of parallel carriers in accordance with the number of parallel carriers and the timing and organizes the data. The IFFT 23 then performs an inverse Fourier transform for the FFT size in accordance with a specified FFT size and timing. To remove interference between symbols, it may be preferable to provide guard intervals before and after one OFDM symbol. A guard interval's time width is determined by a transmission path situation, i.e., the maximum delay time for a delay wave affecting the demodulation. The system restores the parallel data to the serial signal. The system maintains the orthogonality of each carrier with reference to the frequency axis and converts the signal into a time-axis signal to generate a transmitted signal.

The D/A converter 25 converts the transmitted signal into an analog baseband signal. The transmission analog processing section 26 up-converts the signal into an RF frequency band that is then transmitted to a channel from the antenna 11.

On the other hand, each reception system comprises a reception analog processing section 31, an AD converter 32, a synchronization acquisition section 33, an FFT 34, a reception weight multiplier 35, a decoder 36, and a channel characteristic acquisition section 37.

After a signal is received at the antenna 11, the reception analog processing section 31 down-converts the signal from the RF frequency band into a baseband signal. The AD converter 32 converts the signal into a digital signal.

In accordance with a synchronization timing detected by the synchronization acquisition section 33, the system converts the received signal as serial data into parallel data to organize it (at this time, to organize the signal equivalent to one OFDM symbol containing up to the guard interval). The FFT (Fourier transform section) 34 Fourier-transforms the signal corresponding to the effective symbol length. The system extracts a signal for each subcarrier to convert the time-axis signal into the frequency-axis signal.

The channel characteristic acquisition section 37 acquires channel matrix H using a reference signal weighted for each signal multiplexed by a communication destination for transmission. Further, the channel characteristic acquisition section 37 performs a singular value decomposition for the channel matrix to acquire transmission weight matrix V, reception weight matrix $U^H$, and diagonal matrix D. The communication destination transmits the reference signal at a specified interval. Each time the reference signal is transmitted, the channel characteristic acquisition section 37 updates the channel matrix to the most recent one and performs a singular value decomposition for it.

The reception weight matrix $U^H$ is acquired by performing the singular value decomposition for the channel matrix and is placed in the reception weight multiplier 35 of the wireless communication apparatus 1. The transmission weight matrix V is fed back to the communication destination.

In accordance with a parallel-serial converter 207, the reception weight multiplier 35 multiplies the channel matrix H by the reception weight matrix $U^H$ acquired by performing the singular value decomposition for the channel matrix H.

The decoder 208 error-corrects and decodes the weighted received signal to generate received data that is then passed to a higher layer of the communication protocol.

As mentioned above, the SVD-MIMO transmission needs to feedback information about the transmission weight coefficient matrix V from the receiver to the transmitter. The transmission antenna coefficient matrix V comprises transmission vectors $v_i$ for the number of MIMO channels ($V=[v_1, v_2, \ldots, v_{min[M,N]}]$). Since the information amount is large, it is preferable to compress the information amount to be fed back.

The embodiment uses means for transmitting data for V from the receiver to the transmitter. Specifically, the means modulates the amplitude and the phase of a data value to be transmitted and uses a BPSK (Binary Phase Shift Keying) signal.

The wireless communication apparatus 1 and the communication destination performing the SVD-MIMO transmission share a representation form of (amplitude, phase) for representing data to be transmitted, i.e., a form of converting real data into complex data. Transmitted data is allocated to a signal point in the signal space corresponding to the data value for data transmission. The data receiver extracts the original data value according to the combination of the amplitude and the phase at a received signal point.

As transmission data, the following describes transmission vector $v_i$ constituting the transmission antenna weight coefficient matrix V. The number of elements in the transmission vector $v_i$ corresponds to the number of transmitter's antennas. Since there are two antennas, the vector $v_i$ is assumed to be $(v_{i(1)}, v_{i(2)})$. To transmit $v_{i(1)}$, for example, it may be modulated using a known point $Ae^{j\square}$ in the signal space. In this case, the receiver can multiply the received signal by $1/A \cdot e^{-j\square}$ to extract the amplitude and the phase and acquire $v_{i(1)}$.

When the system transmits one OFDM symbol of the amplitude and phase modulation signal for vectors, it is possible to transmit one vector v for 52 carriers. Accordingly, a 2×3 SVD-MIMO communication system just needs to transfer the reference signal, and then two OFDM symbols of the amplitude and phase modulation signal for vectors.

The following describes a process to feed back the transmission weight coefficient matrix V. It is assumed that there are two transmission antennas, three reception antennas, and two independent MIMO channels.

Figure 4:
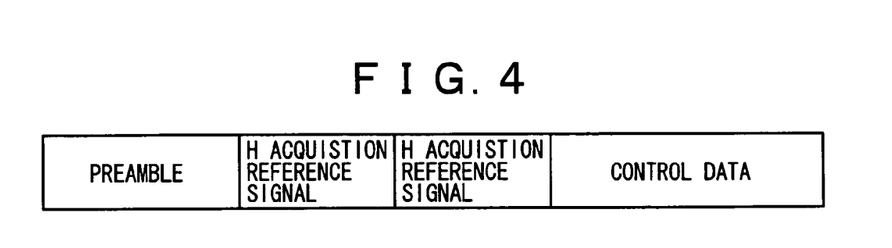
FIG. 4 shows an example of the configuration of a frame used for transmitting a reference signal.

Step 1:

The transmitter transmits an H acquisition reference signal for acquiring the channel matrix H to the receiver. FIG. 4 shows an example of the frame configuration used for reference signal transmission. In the example of FIG. 4, the transmission frame begins with a preamble signal for synchronization acquisition and automatic gain control followed by two H acquisition reference signals and control data. When the RTS/CTC system provides media access control, for example, the transmission frame in FIG. 4 can be configured to be an RTS frame.

Step 2:

When receiving the H acquisition reference signal, the receiver calculates and stores the channel matrix H based on channel estimation from the reference signal. The channel matrix H becomes a 3×2 matrix because the transmitter has two antennas and the receiver has three antennas. The receiver can acquire and store 52 3×2 matrices equivalent to OFDM subcarriers.

Step 3:

The receiver performs a singular value decomposition for the acquired channel matrix H to decompose H to be $UDV^H$. The singular value decomposition is performed for 52 carriers. The receiver acquires reception weight coefficient matrices $U^H$ for the receiver and transmission weight coefficient matrices V for the transmitter for the number of independent MIMO channels, i.e., as many as 2 by 52 carriers. The transmission weight coefficient matrix comprises 2×1 transmission vectors v.

Figure 5:
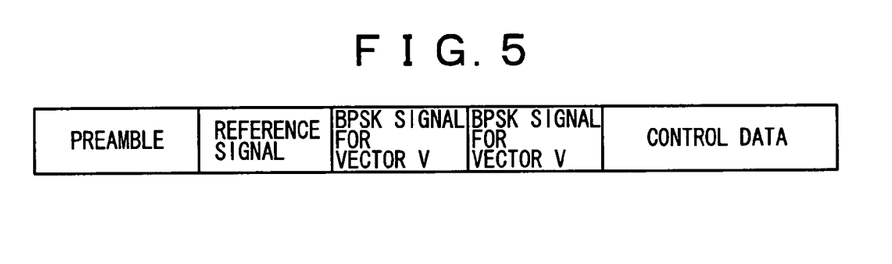
FIG. 5 shows an example of the configuration of a transmission frame used for transmitting transmission vector v.

Step 4:

The receiver transmits the transmission vectors v to the transmitter. The receiver transmits one OFDM symbol of the reference signal for channel matrix H estimation and two OFDM symbols of the BPSK signal for the vector V. FIG. 5 shows a configuration example of the transmission frame used to transmit the transmission vectors v. When the RTS/CTC system provides media access control, for example, the transmission frame in FIG. 5 can be configured to be a CTS frame.

Step 5:

The transmitter receives the reference signal and the amplitude and phase modulation signal for transmission vectors v from the receiver. Using the reference signal, the transmitter removes effects such as phasing on the transmission path from the received signals. The transmitter then receives the weight vectors v for transmission to construct the transmission weight coefficient matrix V and places this matrix in the transmission weight multiplier 22.

Figure 6:
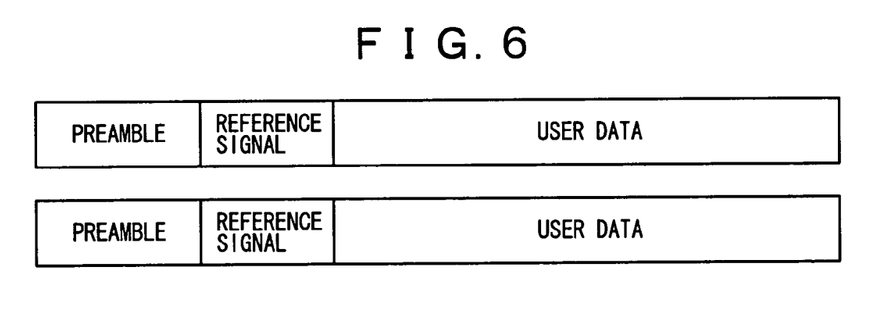
FIG. 6 shows an example of the configuration of a data frame to be transmitted through the use of transmission weight V.

Step 6:

The transmitter transmits signals using the transmission weight V. On the other hand, the receiver receives signals using the reception weight $U^H$ (FIG. 6). It is possible to provide the SVD-MIMO communication capable of transmitting and receiving two independent streams at the same frequency and the same time.

[Supplement]

There has been described the present invention with reference to the specific embodiment. It is further understood by those skilled in the art that various changes and modifications may be made in the embodiment without departing from the spirit and scope of the present invention. In short, the present invention has been disclosed as an example. The contents of this specification should not be interpreted restrictively. The appended claims should be taken into consideration for evaluation of the gist of the present invention.

What is claimed is:

1. A wireless communication system, comprising:
a transmitter and a receiver sharing a representation form of (amplitude, phase) for representing data to be transmitted;
a data transmission side transmits data by allocating it to a signal point in a signal space corresponding to a data value; and
a data reception side extracts an original data value according to a combination of amplitude and phase at a receive signal point,
wherein said system adopt employs a space division multiplexing communication to multiplex signals for communication using a pair of transmitters and receivers each having a plurality of antennas; and including,
singular value decomposition means for acquiring channel matrix H from a transmitter to a receiver in space division multiplexing, performing a singular value decomposition for said channel matrix into $UDV^H$, and finding transmission antenna weight matrix V including, as element vectors, transmission weight vectors for each transmission antenna;
transmission antenna weight matrix feedback means for allocating element vectors constituting transmission antenna weight matrix V to a signal point in a signal space for encoding and feeding an encoded signal from said receiver back to said transmitter;
weight matrix reception means for allowing said transmitter to decode element vectors from a combination of amplitude and phase at a received signal point and restore transmission antenna weight matrix V, and for appending a reference signal to an encoded signal for transmission; and
wherein said weight matrix reception means receives transmission antenna weight matrix V by removing fluctuations on a transmission path based on said reference signal.

2. A wireless communication apparatus, sharing a representation form of (amplitude, phase) for representing data to be transmitted with a communication destination comprising:
encoding means for allocating transmission data to a signal point in a signal space corresponding to a data value for encoding;
transmission means for transmitting an encoded signal;
a plurality of antennas;
reception means for receiving a multiplexed signal from a transmitter having a plurality of antennas;
channel estimation means for finding channel matrix H from a reference signal transmitted from a transmitter;
singular value decomposition means for performing a singular value decomposition for channel matrix H into $UDV^H$ to acquire reception weight matrix U, diagonal matrix D, and transmission weight matrix V;
encoding means for allocating element vectors constituting transmission antenna weight matrix V to a signal point in a signal space for encoding; and
transmission antenna weight matrix feedback means for feeding said encoded signal back to said transmitter and for appending a reference signal to an encoded signal for transmission.

3. A wireless communication method of using a plurality of antennas to receive a multiplexed signal from a transmitter having a plurality of antennas, said method comprising:
finding channel matrix H from a reference signal transmitted from a transmitter;
performing a singular value decomposition for channel matrix H into $UDV^H$ to acquire reception weight matrix U, diagonal matrix D, and transmission weight matrix V;
allocating element vectors constituting transmission antenna weight matrix V to a signal point in a signal space for encoding; and
feeding said encoded signal back to said transmitter.

4. A computer-readable storage medium encoded with computer program instructions which cause a computer to perform a process for using a plurality of antennas to receive a multiplexed signal from a transmitter having a plurality of antennas, comprising:
finding channel matrix H from a reference signal transmitted from a transmitter;
performing a singular value decomposition for channel matrix H into $UDV^H$ to acquire reception weight matrix U, diagonal matrix D, and transmission weight matrix V;
allocating element vectors constituting transmission antenna weight matrix V to a signal point in a signal space for encoding; and
feeding said encoded signal back to said transmitter.

* * * * *